GEORGE WELLHOUSE, OF AKRON, OHIO.

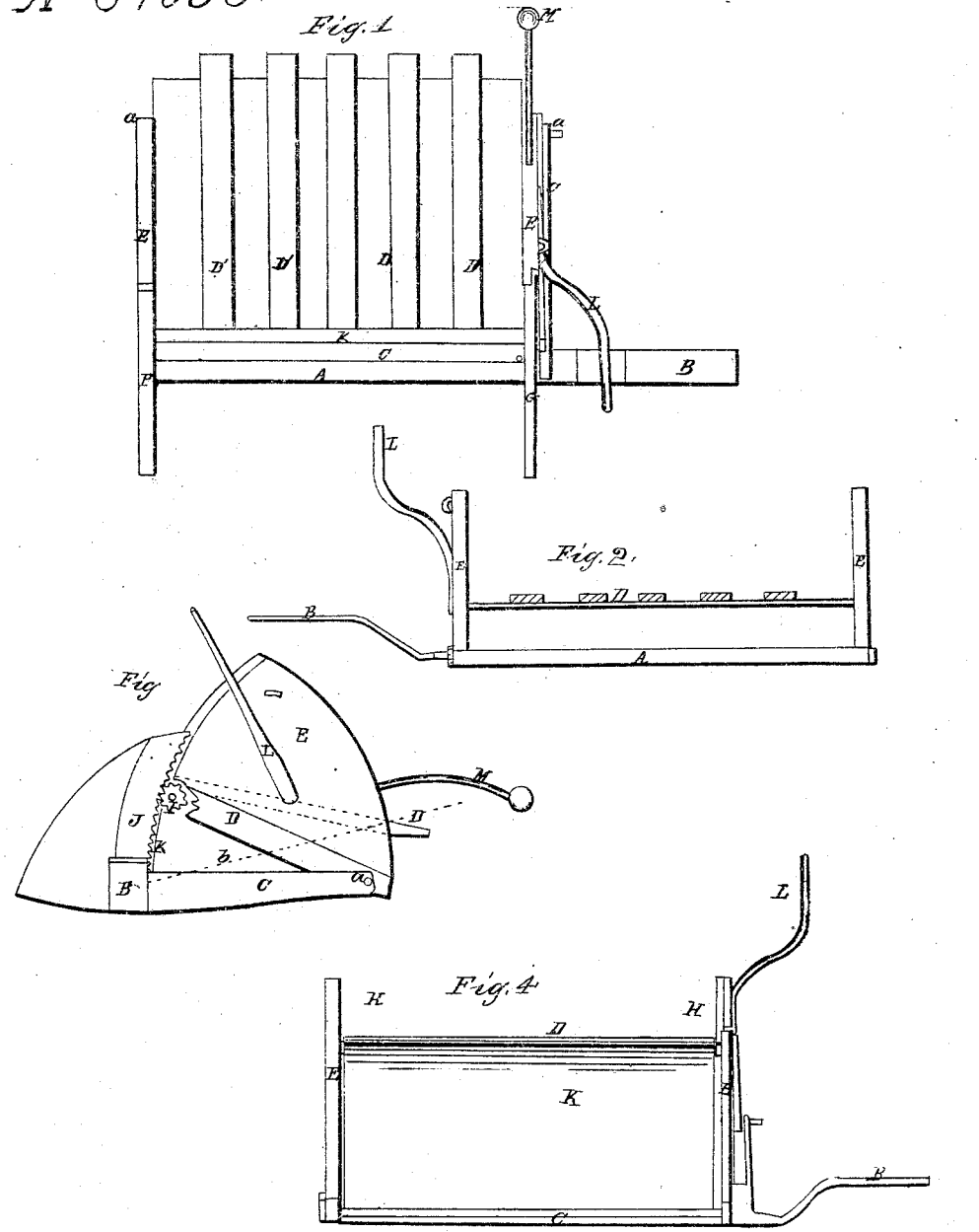

Letters Patent No. 84,033, dated November 10, 1868.

IMPROVEMENT IN DROPPING-PLATFORMS FOR HARVESTERS.

The Schedule referred to in these Letters Patent and making part of the same.

*To all whom it may concern:*

Be it known that I, GEORGE WELLHOUSE, of Akron, in the county of Summit, and State of Ohio, have invented a certain new and improved Harvester; and I do hereby declare that the following is a full and complete description of the same, reference being had to the accompanying drawings, making a part of this specification, in which—

Figure 1 is a top view of the apparatus.
Figure 2 is a rear-end view of the same.
Figure 3 is a side view.
Figure 4 is a front view.

Like letters of referene refer to like parts in the several views.

In fig. 1, A represents the finger-bar, which is connected to the machine by the coupling-arm B. To said finger-bar is attached a frame, C, to which is pivoted the rear end of the platform D at the points a, whereas the front end is free, so that it can be elevated, as shown in fig. 3. E are the sides of the platform; F, the dividing-board; and G, the grain-guard.

Extending across the free end of the platform is a roller, H, which has its bearings in the ends F. On one end of the said roller is keyed a pinion-wheel, I, fig. 3, a portion of the frame being represented as broken away in order that it may be seen. This pinion is so arranged that it is made to engage in the toothed segment J, so that as the platform is elevated or depressed, the pinion is made to revolve, thereby giving motion to the roller referred to.

To this roller is attached one end of the apron K, fig. 3, whereas the other is attached to the front side of the frame to which the platform is hinged, the purpose of which will presently be shown.

The practical operation of this device is as follows, viz: As the machine advances in the line of work, the position of the platform is such as shown in figs. 1 and 2, in which it will be seen that the rear end is so elevated above the frame as to give it an inclination downward to the cutter-bar, as indicated by the dotted lines b, fig. 3, and that the front edge and roller are but little raised above the cutter-bar. Now, when sufficient grain has gathered upon the platform for a bundle, it is then raised upward by the lever L to the position indicated by the dotted lines c, fig. 3, which will cause the prostrate grain on the platform to slide back and off on to the ground. Now, while the platform is being raised, the roller, by means of the pinion and segment above described, is made to revolve, and, in so doing, unwinds the apron which presents a covering to the opening caused by the elevation of the platform, and into which the grain still being cut would fall, were it not for the apron, but against which and the edge of the platform the cut grain inclines, until the platform is returned to its former position, on to which the grain now will fall, to be thrown off by the elevation of the platform, as before.

It will be observed that the winding up of the apron, on the descent of the platform, and the unwinding of the same on its ascent, are effected by the pinion and segment, no other mechanical appliance being employed for that purpose. The platforms of machines in ordinary use lie flat or horizontally with the ground, in consequence of which, as the machine moves over sidelands or hills, the grain will slip back and off from the platform to the ground; but by having the rear end of the platform elevated above the frame or the axial points a, the grain cannot slide off; hence, will remain until the elevating of the front end for that purpose. It will also be seen that as the front end of the platform is being elevated, it receives, at the same time, a backward movement, in consequence of the said platform being above the axial points a.

The advantage of this backward movement is to throw the front end of the platform back, more out of the way of the reel, thereby giving more room for the cut grain as it stands leaning against the apron, and, as will be obvious, gives more lean to the grain, which, therefore, will be less inclined to fall over forward during the elevation of the platform. The platform may be constructed close, as represented at D, or with open slats, as indicated by the slats D'.

I am aware that platforms have been so constructed and arranged that they can be elevated at the front in order to allow the grain to slide off, and that aprons have been employed for closing the opening under the platform; but in such machines the roller is located near to and attached to the finger-bar, and caused to revolve by a complicated arrangement of wheels; whereas, in this machine, the roller is attached to the platform, and operated by a pinion and segment, as above described, which is a much more simple and efficient manner of operation, as well as less expensive, than that above instanced.

What I claim as my improvement, and desire to secure by Letters Patent, is—

The arrangement and combination of the roller H, pinion I, segment J, and platform D, in the manner substantially as set forth.

GEORGE WELLHOUSE.

Witnesses:
W. H. BURRIDGE,
J. H. BURRIDGE.